United States Patent
Pulisciano et al.

(10) Patent No.: US 11,579,046 B2
(45) Date of Patent: Feb. 14, 2023

(54) METHODS AND APPARATUS FOR INSPECTING AN ENGINE

(71) Applicant: ROLLS-ROYCE plc, London (GB)

(72) Inventors: Adriano Pulisciano, Birmingham (GB); Bilal M Nasser, Derby (GB); Paul A Flint, Derby (GB)

(73) Assignee: ROLLS-ROYCE plc, London (GB)

(*) Notice: Subject to any disclaimer, the term of this patent is extended or adjusted under 35 U.S.C. 154(b) by 141 days.

(21) Appl. No.: 16/950,274

(22) Filed: Nov. 17, 2020

(65) Prior Publication Data

US 2021/0172837 A1     Jun. 10, 2021

(30) Foreign Application Priority Data

Dec. 10, 2019  (GB) ..................................... 1918095

(51) Int. Cl.
  *G01M 15/14*  (2006.01)
  *G01B 11/00*  (2006.01)
  *G01N 21/95*  (2006.01)

(52) U.S. Cl.
  CPC ........... *G01M 15/14* (2013.01); *G01B 11/005* (2013.01); *G01N 21/95* (2013.01)

(58) Field of Classification Search
  CPC ...... G01M 15/14; G01B 11/005; G01B 11/00; G01B 11/002; G01B 11/02; G01B 11/022; G01B 11/026; G01B 11/028; G01B 11/03; G01B 11/04; G01B 11/16; G01N 21/00; G01N 21/95; G01N 21/9515;
  (Continued)

(56) References Cited

U.S. PATENT DOCUMENTS 9,816,809 B2 * 11/2017 Hebert ................ H04N 5/2256
2004/0060347 A1   4/2004 Comperat et al.
(Continued)

FOREIGN PATENT DOCUMENTS

EP   2767674 A1    8/2014
EP   3096123 A1 * 11/2016 ......... B60R 16/0234
(Continued)

OTHER PUBLICATIONS

Apr. 16, 2021 Search Report issued in European Patent Application No. 20207703.8.
(Continued)

*Primary Examiner* — Daniel R Miller
*Assistant Examiner* — Eric Sebastian Von Wald
(74) *Attorney, Agent, or Firm* — Oliff PLC

(57) ABSTRACT

A computer-implemented method comprising: receiving data comprising two-dimensional data and three-dimensional data of a component of an engine; identifying a feature of the component using the two-dimensional data; determining coordinates of the feature in the two-dimensional data; determining coordinates of the feature in the three-dimensional data using: the determined coordinates of the feature in the two-dimensional data; and a pre-determined transformation between coordinates in two-dimensional data and coordinates in three-dimensional data; and measuring a parameter of the feature of the component using the determined coordinates of the feature in the three-dimensional data.

13 Claims, 12 Drawing Sheets

(58) Field of Classification Search
CPC .............. G01N 21/954; G01N 21/956; G01N 21/95607; G01N 21/95623; G01N 2021/1785; G05B 2219/37553; G05B 2219/37554; G05B 2219/37555; G05B 2219/37558; G05B 2219/37559; G05B 2219/40588; G05B 2219/40; G05B 2219/40589; G05B 2219/40601; G05B 2219/36504; G05B 2219/33263; G06T 3/00; G06T 3/0031; G06T 3/0043; G06T 3/0056; G06T 3/40; G06T 2200/00; G06T 2200/04; G06T 11/00; G06T 17/00; G06V 20/647; G06V 20/00; G06V 20/60; G06V 20/64; H04N 2201/04; H04N 2201/00; H04N 2201/0471
See application file for complete search history.

(56) References Cited

U.S. PATENT DOCUMENTS

| | | |
|---|---|---|
| 2005/0219519 A1 | 10/2005 | Harding et al. |
| 2009/0079563 A1 | 3/2009 | Tsuji |
| 2010/0049379 A1 | 2/2010 | Vial |
| 2011/0221877 A1 | 9/2011 | Hori et al. |
| 2013/0328872 A1 | 12/2013 | Suomi et al. |
| 2013/0335530 A1 | 12/2013 | Hatcher, Jr. et al. |
| 2015/0285619 A1 | 10/2015 | Motohashi et al. |
| 2015/0300920 A1 | 10/2015 | DeAscanis et al. |
| 2016/0171705 A1* | 6/2016 | Bendall .................. G06T 19/00 382/103 |
| 2016/0275674 A1 | 9/2016 | Rivet-Sabourin et al. |
| 2017/0234772 A1 | 8/2017 | Nirmalan et al. |
| 2018/0060646 A1* | 3/2018 | Harvey ................ G06V 10/141 |
| 2018/0082143 A1 | 3/2018 | Bendall |
| 2019/0338666 A1 | 11/2019 | Finn et al. |

FOREIGN PATENT DOCUMENTS

| | | |
|---|---|---|
| EP | 3096123 A1 | 11/2016 |
| GB | 2130753 A | 6/1984 |
| WO | 2017/003650 A1 | 1/2017 |

OTHER PUBLICATIONS

Jun. 4, 2020 Search Report issued in British Patent Application No. 1918095.9.

May 21, 2020 Search Report issued in British Patent Application No. 1918094.2.

U.S. Appl. No. 16/950,260, filed Nov. 17, 2020 in the name of Paul A Flint et al.

May 7, 2021 Search Report issued in European Patent Application No. 20207704.6.

Jun. 20, 2022, Office Action issued in U.S. Appl. No. 16/950,260.

Nov. 3, 2022 Office Action issued in U.S. Appl. No. 16/950,260.

Nov. 28, 2022 Extended Search Report issued in European Patent Application No. 22205963.6.

Dave Wilson, "Endoscopes Inspect Aircraft Engines While on the Wing," Apr. 10, 2017.

\* cited by examiner

METHODS AND APPARATUS FOR INSPECTING AN ENGINE

CROSS-REFERENCE TO RELATED APPLICATIONS

This specification is based upon and claims the benefit of priority from UK Patent Application Number 1918095.9 filed on 10 Dec. 2019, the entire contents of which are incorporated herein by reference.

TECHNOLOGICAL FIELD

The present disclosure concerns methods and apparatus for inspecting an engine.

BACKGROUND

Aircraft typically comprise one or more engines for providing propulsive thrust and/or electrical energy to the aircraft. During operation, the one or more engines may become damaged (for example, due to relatively high operating temperatures or due to foreign object damage). Aircraft engines are usually inspected at regular intervals by a human inspector to determine the condition of components within the engine. Where components are found to be in an unacceptable condition, the engine is usually removed from the aircraft for repair. During such inspections, the aircraft is grounded and is not available for operation by the airline. Additionally, the quality and duration of the inspection is dependent upon the skill and experience of the inspector.

BRIEF SUMMARY

According to a first aspect there is provided a computer-implemented method comprising: receiving data comprising two-dimensional data and three-dimensional data of a component of an engine; identifying a feature of the component using the two-dimensional data; determining coordinates of the feature in the two-dimensional data; determining coordinates of the feature in the three-dimensional data using: the determined coordinates of the feature in the two-dimensional data; and a pre-determined transformation between coordinates in two-dimensional data and coordinates in three-dimensional data; and measuring a parameter of the feature of the component using the determined coordinates of the feature in the three-dimensional data.

Prior to identifying the feature of the component, the method may further comprise: identifying the feature of the component using the three-dimensional data; determining coordinates in the three-dimensional data of a first volume bounding the coordinates of the feature; determining coordinates of a first area in the two-dimensional data corresponding to the first volume using: the determined coordinates of the first volume in the three-dimensional data; and the predetermined transformation.

Identifying the feature of the component using the two-dimensional data may comprise using a subset of the two-dimensional data corresponding to the first area.

Determining coordinates in the three-dimensional data of the first volume may comprise: identifying the first volume in the three-dimensional data using: the identified feature of the component; and a three-dimensional model of the component.

Prior to identifying the feature of the component using the three-dimensional data, the method may further comprise: identifying a second area using the two-dimensional data of the component, the second area excluding predetermined components and/or predetermined sub-components of the engine within the two-dimensional data; determining coordinates of a second volume in the three-dimensional data corresponding to the second area using: the determined coordinates of the second area in the two-dimensional data; and the predetermined transformation.

Identifying the feature of the component using the three-dimensional data may comprise: identifying the feature of the component using a subset of the three-dimensional data corresponding to the second volume.

The computer-implemented method may further comprise: controlling storage of the measured parameter.

The engine may be associated with an aircraft, and the data may be generated during a first period of time in which the aircraft is not released for operation.

The computer-implemented method may be performed during a second period of time in which the aircraft is released for operation.

The computer-implemented method may be performed automatically in response to receiving the data.

The computer-implemented method may be performed without human intervention.

According to a second aspect there is provided a computer program that, when executed by a computer, causes the computer to perform the computer-implemented method as described in any of the preceding paragraphs.

According to a third aspect there is provided a non-transitory computer readable storage medium comprising computer readable instructions that, when executed by a computer, causes the computer to perform the computer-implemented method as described in any of the preceding paragraphs.

According to a fourth aspect there is provided an apparatus comprising: a controller configured to perform the computer-implemented method as described in any of the preceding paragraphs.

According to a fifth aspect there is provided a method comprising: inspecting an engine during a first period of time to identify damage, the engine being associated with an aircraft; receiving three-dimensional data of one or more components of the engine, the three-dimensional data being generated during the first period of time; determining, during the first period of time, whether the identified damage exceeds a threshold; providing instructions to release the aircraft for operation in a second period of time, subsequent to the first period of time, if the identified damage does not exceed the threshold; and inspecting the received three-dimensional data during the second period of time to measure damage.

Inspecting the received three-dimensional data comprises: identifying a feature of the component using the three-dimensional data; determining coordinates of the feature in the three-dimensional data; and measuring a parameter of the feature of the component using the determined coordinates of the feature in the three-dimensional data.

The method may further comprise: receiving data comprising two-dimensional data of the component of the engine, the two-dimensional data being generated during the first period of time; and wherein inspecting the received three-dimensional data comprises: identifying a feature of the component using the two-dimensional data; determining coordinates of the feature in the two-dimensional data; determining coordinates of the feature in the three-dimensional data using: the determined coordinates of the feature in the two-dimensional data; and a pre-determined transformation between coordinates in two-dimensional data and coordinates in three-dimensional data; and measuring a parameter of the feature of the component using the determined coordinates of the feature in the three-dimensional data.

Prior to identifying the feature of the component using the two-dimensional data, the method may further comprise: identifying the feature of the component using the three-dimensional data; determining coordinates in the three-dimensional data of a first volume bounding the coordinates of the feature; determining coordinates of a first area in the two-dimensional data corresponding to the first volume using: the determined coordinates of the first volume in the three-dimensional data; and the predetermined transformation.

Identifying the feature of the component using the two-dimensional data may comprise using a subset of the two-dimensional data corresponding to the first area.

Determining coordinates in the three-dimensional data of the first volume may comprise: identifying the first volume in the three-dimensional data using: the identified feature of the component; and a three-dimensional model of the component.

Prior to identifying the feature of the component using the three-dimensional data, the method may further comprise: identifying a second area using the two-dimensional data of the component, the second area excluding predetermined components and/or predetermined sub-components of the engine within the two-dimensional data; determining coordinates of a second volume in the three-dimensional data corresponding to the second area using: the determined coordinates of the second area in the two-dimensional data; and the predetermined transformation.

Identifying the feature of the component using the three-dimensional data may comprise: identifying the feature of the component using a subset of the three-dimensional data corresponding to the second volume.

The method may further comprise: controlling storage of the measured parameter.

Inspecting the received three-dimensional data during the second period of time may be performed by a computer.

Inspecting the received three-dimensional data during the second period of time may be performed automatically by the computer in response to receiving the three-dimensional data.

Inspecting the received three-dimensional data may be performed during a predetermined period of time from release of the aircraft for operation.

According to a sixth aspect there is provided a computer program that, when executed by a computer, causes the computer to perform the method as described in any of the preceding paragraphs.

According to a seventh aspect there is provided a non-transitory computer readable storage medium comprising computer readable instructions that, when executed by a computer, causes the computer to perform the method as described in any of the preceding paragraphs.

According to an eighth aspect there is provided an apparatus comprising: a controller configured to perform the method as described in any of the preceding paragraphs.

According to a ninth aspect there is provided a method comprising: inspecting an industrial system during a first period of time to identify damage; receiving three-dimensional data of one or more components of the industrial system, the three-dimensional data being generated during the first period of time; determining, during the first period of time, whether the identified damage exceeds a threshold; providing instructions to enable operation of the industrial system in a second period of time, subsequent to the first period of time, if the identified damage does not exceed the threshold; and inspecting the received three-dimensional data during the second period of time to measure damage.

According to a tenth aspect there is provided a method comprising: inspecting an engine during a first period of time to identify damage, the engine being associated with an aircraft; receiving two-dimensional data of one or more components of the engine, the two-dimensional data being generated during the first period of time; determining, during the first period of time, whether the identified damage exceeds a threshold; providing instructions to release the aircraft for operation in a second period of time, subsequent to the first period of time, if the identified damage does not exceed the threshold; and inspecting the received two-dimensional data during the second period of time to measure damage.

According to an eleventh aspect there is provided a method comprising: inspecting an industrial system (for example, an engine) during a first period of time to identify damage (the engine may, or may not be associated with an aircraft); receiving data of one or more components of the industrial system, the data being generated during the first period of time; determining, during the first period of time, whether the identified damage exceeds a threshold; providing instructions to enable operation of the industrial system in a second period of time, subsequent to the first period of time, if the identified damage does not exceed the threshold; and inspecting the received data during the second period of time to measure damage.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
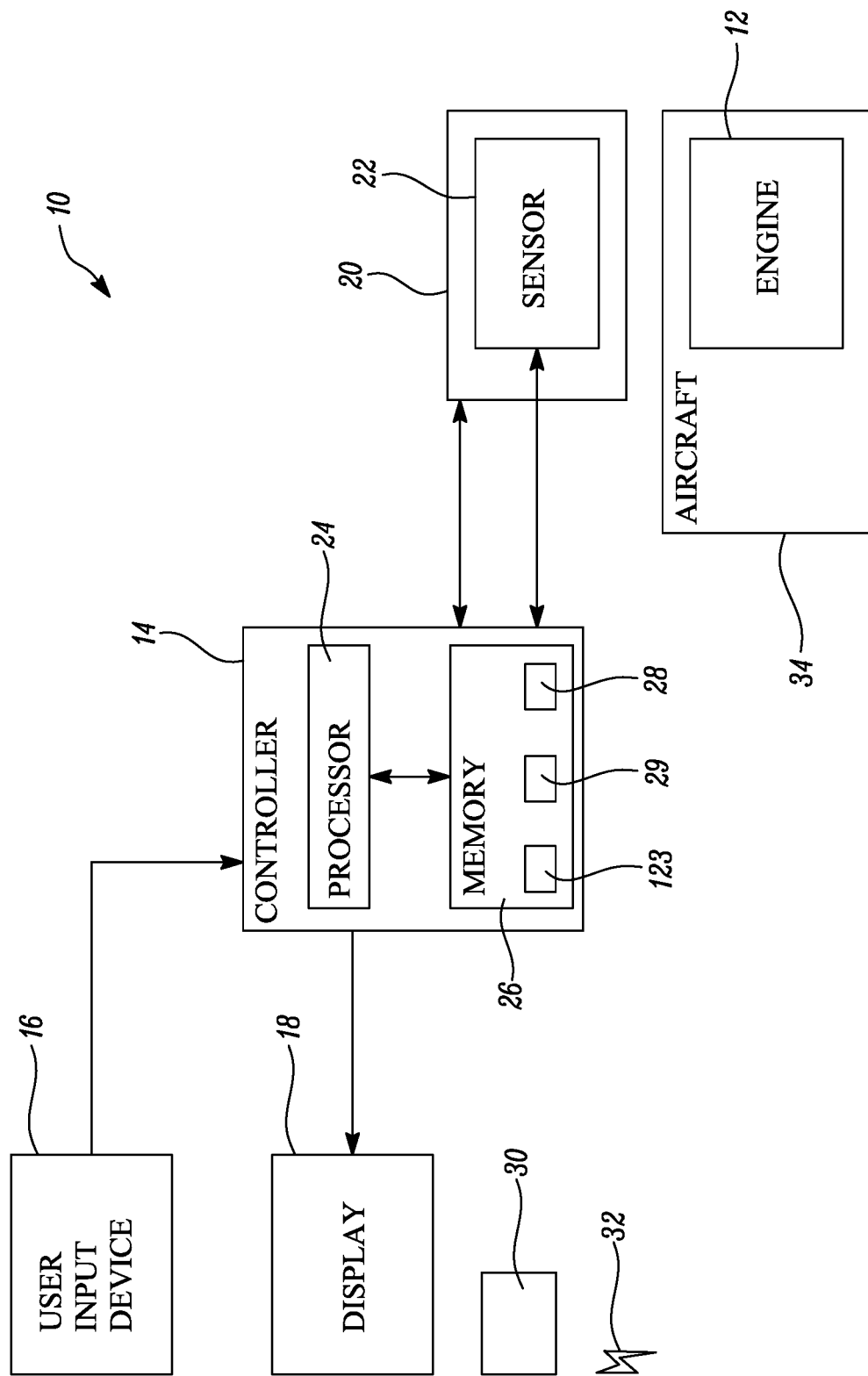
FIG. 1 illustrates a schematic diagram of an apparatus for inspection of an engine according to various examples.

FIG. 1 illustrates a schematic diagram of an apparatus 10 for inspecting an engine 12 according to various examples. The apparatus 10 includes: a controller 14; a user input device 16; a display 18; and an inspection device 20 comprising a sensor 22.

In some examples, the apparatus 10 may be a module. As used herein, the wording 'module' refers to a device or apparatus where one or more features are included at a later time and, possibly, by another manufacturer or by an end user. For example, where the apparatus 10 is a module, the apparatus 10 may only include the controller 14, and the remaining features (such as the user input device 16, the display 18, the inspection device 20 and the sensor 22) may be added by another manufacturer, or by an end user.

The controller 14, the user input device 16, the display 18, the inspection device 20 and the sensor 22 may be coupled to one another via a wireless link and may consequently comprise transceiver circuitry and one or more antennas. Additionally, or alternatively, the controller 14, the user input device 16, the display 18, the inspection device 20 and the sensor 22 may be coupled to one another via a wired link and may consequently comprise interface circuitry (such as a Universal Serial Bus (USB) plugs and sockets).

The controller 14 may comprise any suitable circuitry to cause performance of the methods described herein and as illustrated in FIGS. 5, 8, 12, 13 and 14. The controller 14 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

In various examples, the controller 14 may comprise at least one processor 24 and at least one memory 26. The memory 26 stores a computer program 28 comprising computer readable instructions that, when read by the processor 24, causes performance of the methods described herein, and as illustrated in FIGS. 5, 8, 12, 13 and 14. The computer program 28 may be software or firmware, or may be a combination of software and firmware.

The controller 14 may be part of the inspection device 20, an 'edge' computer or a remote computer (such as a high-performance computing cluster in the 'cloud'). Alternatively, the controller 14 may be distributed between a plurality of devices and locations. For example, the controller 14 may be distributed between the inspection device 20 and an 'edge' computer or may be distributed between the inspection device 20 and a high-performance computing cluster in the 'cloud'.

The processor 24 may include at least one microprocessor and may comprise a single core processor, may comprise multiple processor cores (such as a dual core processor or a quad core processor), or may comprise a plurality of processors (at least one of which may comprise multiple processor cores).

The memory 26 may be any suitable non-transitory computer readable storage medium, data storage device or devices, and may comprise a hard disk and/or solid-state memory (such as flash memory). The memory may be permanent non-removable memory or may be removable memory (such as a universal serial bus (USB) flash drive or a secure digital card). The memory may include: local memory employed during actual execution of the computer program; bulk storage; and cache memories which provide temporary storage of at least some computer readable or computer usable program code to reduce the number of times code may be retrieved from bulk storage during execution of the code.

The computer program 28 may be stored on a non-transitory computer readable storage medium 30. The computer program 28 may be transferred from the non-transitory computer readable storage medium 30 to the memory 26. The non-transitory computer readable storage medium 30 may be, for example, a USB flash drive, an external hard disk drive, an external solid-state drive, a secure digital (SD) card, an optical disc (such as a compact disc (CD), a digital versatile disc (DVD) or a Blu-ray disc). In some examples, the computer program 28 may be transferred to the memory 26 via a signal 32 (which may be a wireless signal or a wired signal).

Input/output devices may be coupled to the controller 14 either directly or through intervening input/output controllers. Various communication adaptors may also be coupled to the controller 14 to enable the apparatus 10 to become coupled to other apparatus or remote printers or storage devices through intervening private or public networks. Non-limiting examples include modems and network adaptors of such communication adaptors.

The user input device 16 may comprise any suitable device or devices for enabling a user to at least partially control the apparatus 10. For example, the user input device 16 may comprise one or more of a keyboard, a keypad, a touchpad, a touchscreen display, and a computer mouse. The user input device 16 may be part of, or a peripheral of, the inspection device 20, an 'edge' computer or a remote computer (for example, a computer in the 'cloud' which is located in another city or country). The controller 14 is configured to receive signals from the user input device 16.

The display 18 may be any suitable display for conveying information to an operator. For example, the display 18 may be a liquid crystal display, a light emitting diode display, an active matrix organic light emitting diode display, or a thin film transistor display, or a cathode ray tube display. The display 18 may be part of, or a peripheral of, the inspection device 20, an 'edge' computer, or a remote computer (for example, a computer in the 'cloud' which is located in another city or country). The controller 14 is arranged to provide a signal to the display 18 to cause the display 18 to convey information to the user.

The inspection device 20 may be separate to the engine 12 and may be inserted into the engine 12 to inspect the engine 12. For example, the inspection device 20 may be a borescope comprising a flexible tube (such as a snake arm), where the sensor 22 is mounted at one end of the flexible tube, and the display 18 is mounted at the opposite end of the flexible tube. Alternatively, the inspection device 20 may be embedded within the engine 12 and positioned to inspect the engine 12 at one or more locations. The controller 14 may be configured to control the operation of the inspection device 20. For example, where the inspection device 20 is a robot, the controller 14 may be configured to control the position and pose of the inspection device 20 within the engine 12.

The sensor 22 is configured to generate three-dimensional data and may comprise a structured-light three-dimensional scanner, stereo cameras or any other suitable apparatus. The sensor 22 may also be configured to generate two-dimensional data and may comprise a camera (for example, a charge-coupled device (CCD) or a complementary metal-oxide-semiconductor (CMOS)).

Consequently, in some examples, the sensor 22 may comprise a structured-light three-dimensional scanner for generating three-dimensional data, and a camera for generating two-dimensional data.

Where the sensor 22 comprises a three-dimensional scanner (such as a structured light sensor) and a camera, the memory 26 also stores a transformation algorithm 29 that enables conversion between coordinates in the two-dimensional data generated by the camera, and coordinates in the three-dimensional data generated by the three-dimensional scanner. For example, a transformation algorithm 29 may be generated by the controller 14 for each image and point cloud that is received by the controller 14 (using triangulation and calibration parameters) and which enables conversion between a pixel location in the image file (such as a .jpg, .bmp or .raw file for example) and a point location in the point cloud data (such as a .csv file for example).

Figure 2:
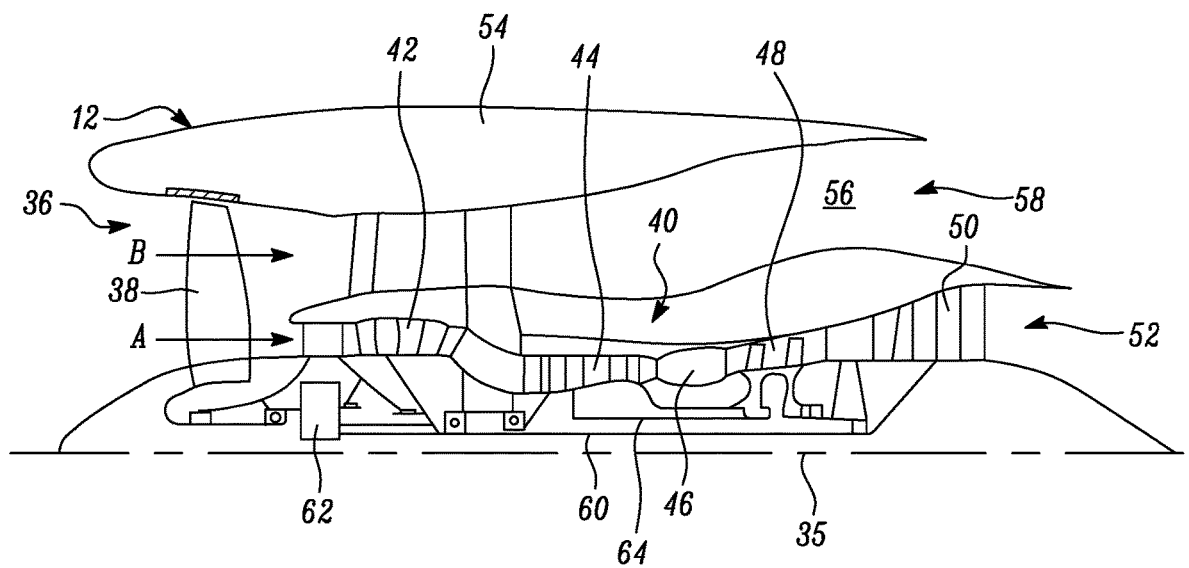
FIG. 2 illustrates a cross sectional side view of a gas turbine engine according to various examples.
Figure 3:
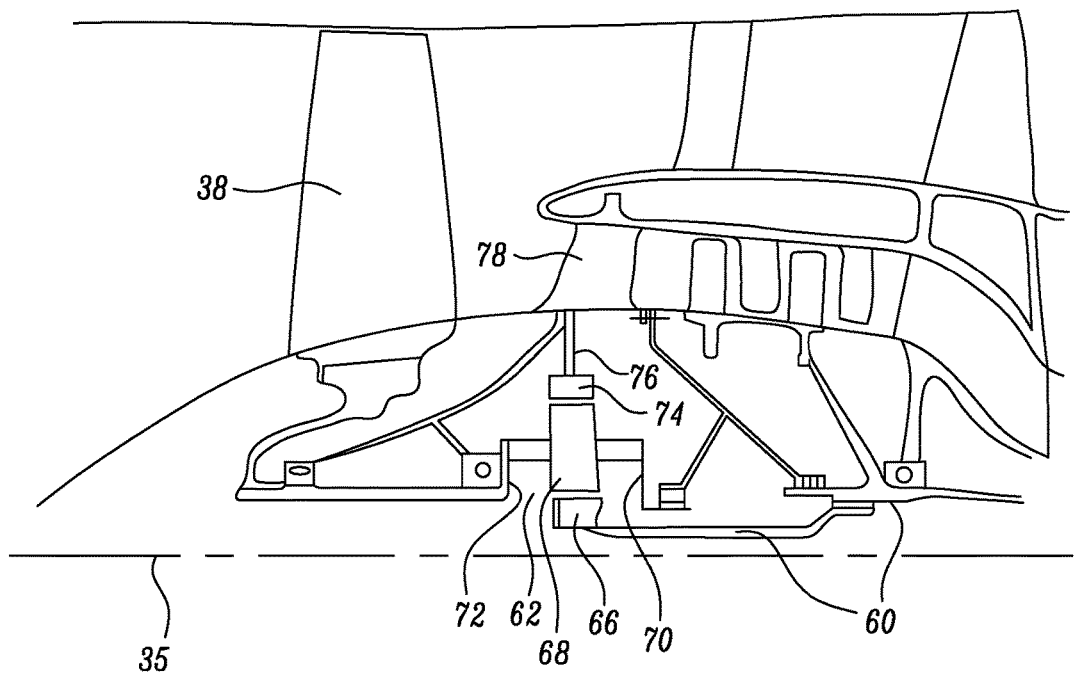
FIG. 3 illustrates a close-up sectional side view of an upstream portion of the gas turbine engine illustrated in FIG. 2.
Figure 4:
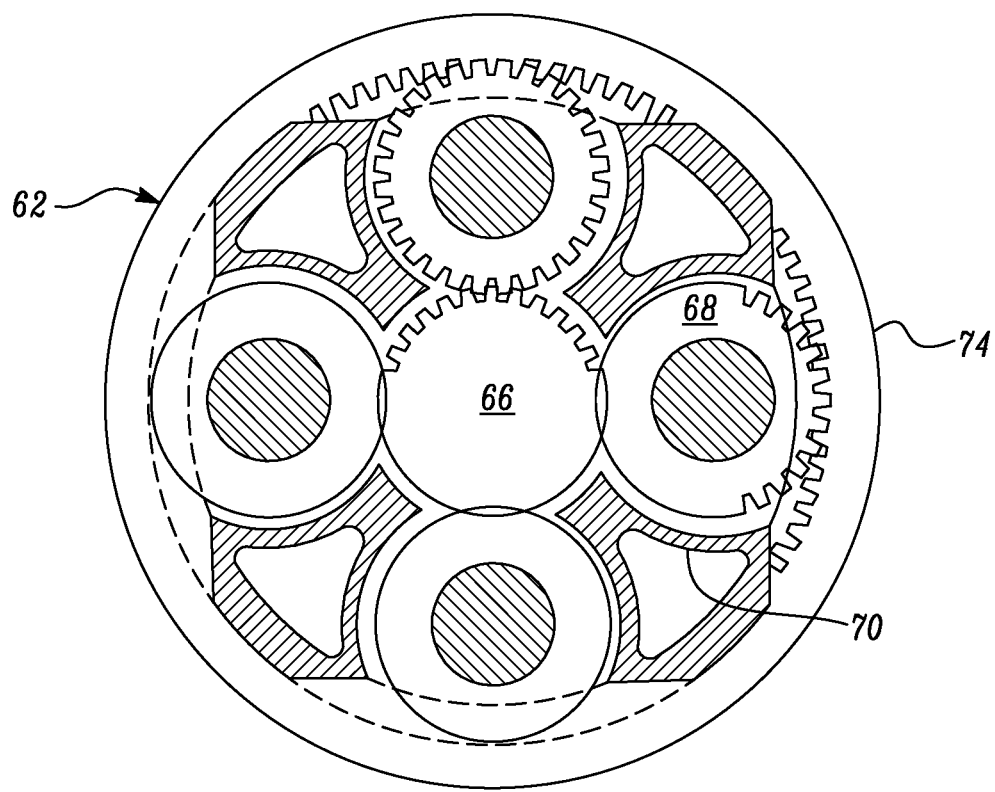
FIG. 4 illustrates a partially cut-away view of the gearbox of the gas turbine engine illustrated in FIGS. 2 and 3.

The engine 12 is associated with an aircraft 34 and is configured to generate propulsive thrust and/or electrical energy for the aircraft 34. For example, the engine 12 may be a gas turbine engine such as a geared turbofan engine (as illustrated in FIGS. 2, 3 and 4) or a 'direct-drive' turbofan engine (where a turbine is directly connected to a fan). Alternatively, the engine 12 may be a reciprocating engine, or an electrical motor. In some examples, the engine 12 may be system comprising a gas turbine engine or a reciprocating engine, and an electrical generator. In such a system, the output of the gas turbine engine or the reciprocating engine is connected to the electrical generator.

The engine 12 may be 'associated' with the aircraft 34 by being mounted on the aircraft 34 (usually referred to as 'on-wing'). For example, the engine 12 may be mounted in or under a wing of the aircraft 34 or may be mounted within or on the fuselage of the aircraft 34. Alternatively, the engine 12 may not be coupled to the aircraft 34, but may be located at the same airport or repair facility as the aircraft 34 (usually referred to as 'near-wing').

FIG. 2 illustrates an example of a gas turbine engine 12 having a principal rotational axis 35 and comprising an air intake 36 and a propulsive fan 38 that generates two airflows: a core airflow A and a bypass airflow B. The gas turbine engine 12 comprises a core 40 that receives the core airflow A. The engine core 40 comprises, in axial flow series, a low-pressure compressor 42, a high-pressure compressor 44, combustion equipment 46, a high-pressure turbine 48, a low-pressure turbine 50 and a core exhaust nozzle 52. A nacelle 54 surrounds the gas turbine engine 12 and defines a bypass duct 56 and a bypass exhaust nozzle 58. The bypass airflow B flows through the bypass duct 56. The fan 38 is attached to and driven by the low-pressure turbine 50 via a shaft 60 and an epicyclic gearbox 62.

In use, the core airflow A is accelerated and compressed by the low-pressure compressor 42 and directed into the high-pressure compressor 44 where further compression takes place. The compressed air exhausted from the high-pressure compressor 44 is directed into the combustion equipment 46 where it is mixed with fuel and the mixture is combusted. The resultant hot combustion products then expand through, and thereby drive, the high-pressure and low-pressure turbines 48, 50 before being exhausted through the nozzle 52 to provide some propulsive thrust. The high-pressure turbine 48 drives the high-pressure compressor 44 by a suitable interconnecting shaft 64. The fan 38 generally provides the majority of the propulsive thrust. The epicyclic gearbox 62 is a reduction gearbox.

An exemplary arrangement for a geared fan gas turbine engine 12 is shown in FIG. 3. The low-pressure turbine 50 (please see FIG. 1) drives the shaft 60, which is coupled to a sun wheel, or sun gear 66 of the epicyclic gear arrangement 62. Radially outwardly of the sun gear 66 and intermeshing therewith is a plurality of planet gears 68 that are coupled together by a planet carrier 70. The planet carrier 70 constrains the planet gears 68 to precess around the sun gear 66 in synchronicity whilst enabling each planet gear 68 to rotate about its own axis. The planet carrier 70 is coupled via linkages 72 to the fan 38 in order to drive its rotation about the engine axis 35. Radially outwardly of the planet gears 68 and intermeshing therewith is an annulus or ring gear 74 that is coupled, via linkages 76, to a stationary supporting structure 78.

Note that the terms "low-pressure turbine" and "low-pressure compressor" as used herein may be taken to mean the lowest pressure turbine stages and lowest pressure compressor stages (i.e. not including the fan 38) respectively and/or the turbine and compressor stages that are connected together by the interconnecting shaft 60 with the lowest rotational speed in the engine 12 (i.e. not including the gearbox output shaft that drives the fan 38). In some literature, the "low-pressure turbine" and "low-pressure compressor" referred to herein may alternatively be known as the "intermediate-pressure turbine" and "intermediate-pressure compressor". Where such alternative nomenclature is used, the fan 38 may be referred to as a first, or lowest pressure, compression stage.

The epicyclic gearbox 62 is shown by way of example in greater detail in FIG. 4. Each of the sun gear 66, planet gears 68 and ring gear 74 comprise teeth about their periphery to intermesh with the other gears. However, for clarity only exemplary portions of the teeth are illustrated in FIG. 4. There are four planet gears 68 illustrated, although it will be apparent to the skilled reader that more or fewer planet gears 68 may be provided. Practical applications of a planetary epicyclic gearbox 62 generally comprise at least three planet gears 68.

The epicyclic gearbox 62 illustrated by way of example in FIGS. 3 and 4 is of the planetary type, in that the planet carrier 70 is coupled to an output shaft via linkages 72, with the ring gear 74 fixed. However, any other suitable type of epicyclic gearbox 62 may be used. By way of further example, the epicyclic gearbox 62 may be a star arrangement, in which the planet carrier 70 is held fixed, with the ring (or annulus) gear 74 allowed to rotate. In such an arrangement the fan 38 is driven by the ring gear 74. By way of further alternative example, the gearbox 62 may be a differential gearbox in which the ring gear 74 and the planet carrier 70 are both allowed to rotate.

It will be appreciated that the arrangement shown in FIGS. 3 and 4 is by way of example only, and various alternatives are within the scope of the present disclosure. Purely by way of example, any suitable arrangement may be used for locating the gearbox 62 in the engine 12 and/or for connecting the gearbox 62 to the engine 12. By way of further example, the connections (such as the linkages 72, 76 in the FIG. 3 example) between the gearbox 62 and other parts of the engine 12 (such as the input shaft 60, the output shaft and the fixed structure 78) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 3. For example, where the gearbox 62 has a star arrangement (described above), the skilled person would readily understand that the arrangement of output and support linkages and bearing locations would typically be different to that shown by way of example in FIG. 3.

Figure 5:
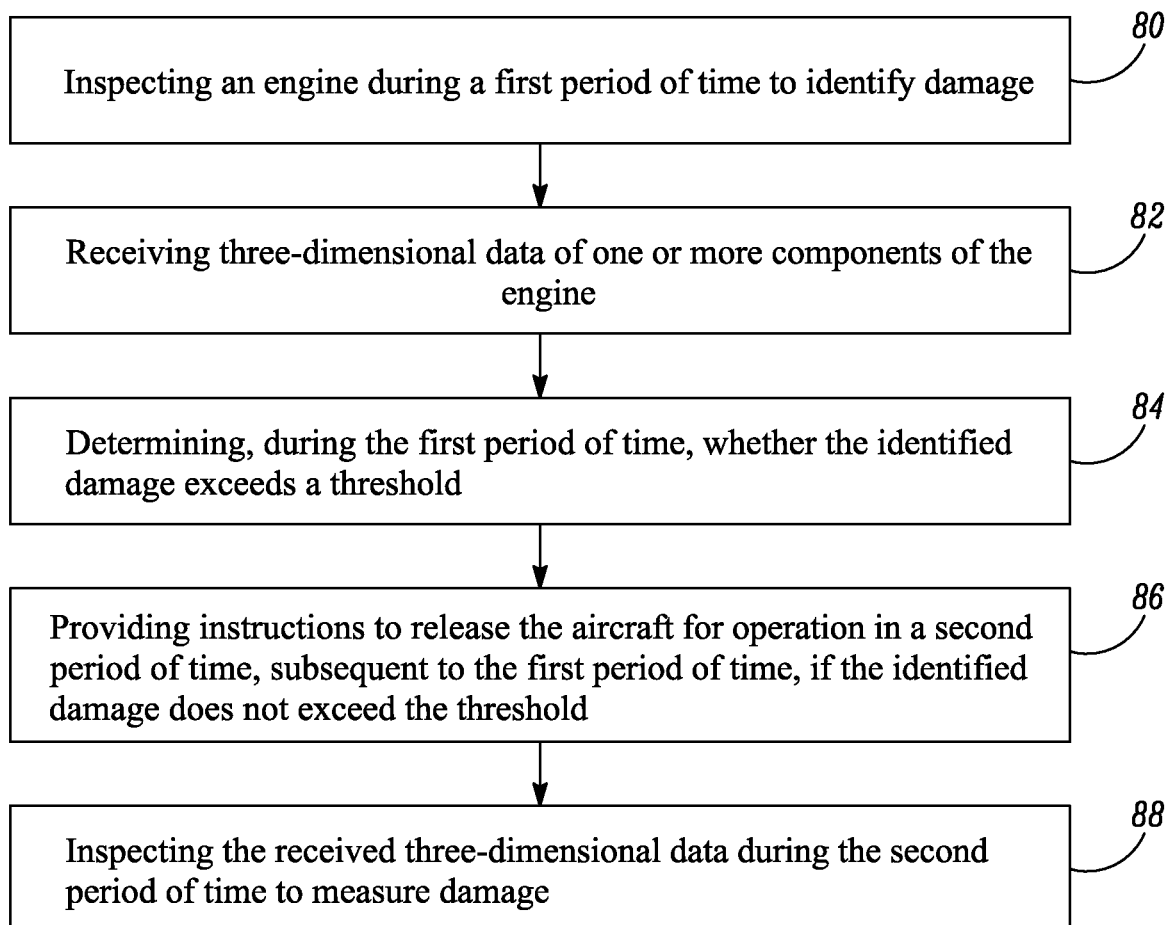
FIG. 5 illustrates a flow diagram of a first method of inspecting an engine.

FIG. 5 illustrates a first method of inspecting the engine 12 according to various examples.

At block 80, the method includes inspecting the engine 12 during a first period of time to identify damage. In some examples, a human inspector may be at the same location as the engine 12 and may use a borescope (which may be the inspection device 20, or may be a separate borescope) to inspect the components of the engine 12. For example, a human inspector may use a borescope to inspect turbine blades of the high-pressure turbine 48 and/or the low-pressure turbine 50 of the gas turbine engine 12 illustrated in FIG. 2 to identify damage.

As used herein, 'damage' includes any change to one or more components of the engine 12 that degrades the one or more components from their initial state, and which may adversely affect the current or future performance of the one or more components. Consequently, 'damage' includes, but is not limited to: loss of material from a component; changes to the shape of a component; and changes to the dimensions of a component.

It should be appreciated that the 'first period of time' is a period of time in which the engine 12 may be inspected 'on-wing' or 'near-wing'. The aircraft 34 is not operational during the first period of time and is not cleared for flight by the control tower of the airport or repair facility.

At block 82, the method includes receiving three-dimensional data of one or more components of the engine 12. In some examples, the inspection device 20 may be inserted into the engine 12 and the controller 14 may receive three-dimensional data of one or more components of the engine 12 illustrated in FIG. 2 from the sensor 22. For example, the inspection device 20 may be inserted into the high-pressure turbine 48 of the gas turbine engine 12 and the controller 14 may receive three-dimensional data of the turbine blades of the high-pressure turbine 48.

Where the sensor 22 comprises a structured-light sensor, the controller 14 may store the three-dimensional data in a row and column pixel order (XY order). In particular, the controller 14 may compute the three-dimensional coordinates of the pixels with projected light using triangulation and calibration parameters, and then store the three-dimensional coordinates in a .csv file using the XY order.

Where the sensor 22 comprises stereo cameras and generates two images, block 82 may further comprise converting the received two-dimensional data into three-dimensional data. In particular, the controller 14 may find corresponding pixel points between stereo images, and then compute three-dimensional coordinates using triangulation and calibration parameters. The controller 14 may then store the three-dimensional coordinates in a .csv file using a row and column pixel order (XY order).

Where the sensor 22 additionally comprises a two-dimensional sensor, block 82 may additionally comprise receiving two-dimensional data of the one or more components of the engine 12. The use of this two-dimensional data is described in detail later with reference to FIGS. 12, 13 and 14.

At block 84, the method includes determining, during the first period of time, whether the identified damage exceeds a threshold. In some examples, the human inspector may determine, using their experience and knowledge, whether the identified damage is acceptable or not for operation on the aircraft 34. For example, where the human inspector identifies damage to turbine blades of the high-pressure turbine 48 at block 80, he or she may, at block 84, determine whether the identified damage is acceptable or not for operation using his or her experience and knowledge.

At block 86, the method includes providing instructions to release the aircraft for operation in a second period of time, subsequent to the first period of time, if the identified damage does not exceed the threshold. In some examples, the human inspector may provide instructions to enable the control tower to release the aircraft 34 for operation in a second period of time. For example, where the human inspector determines, at block 84, that the identified damage to the turbine blades of the high-pressure turbine 48 is acceptable for operation, he may provide instructions to enable the aircraft 34 to be released for operation.

It should be appreciated that the 'second period of time' is a period of time in which the engine 12 and the aircraft 34 are operational and cleared for flight by the control tower of the airport. Consequently, the second period of time may include one or more periods of time in which the aircraft 34 is airborne and in which the aircraft 34 may be carrying humans and/or cargo.

At block 88, the method includes inspecting the received three-dimensional data during the second period of time to measure damage received by the one or more components. Block 88 may be performed by the controller 14. In some examples, block 88 is performed automatically by the controller 14 in response to receiving the three-dimensional data. In other examples, a human operator may initiate the inspection of the received three-dimensional data by operating the user input device 16 and block 88 may be performed by the controller 14 in response to receiving a signal from the user input device 16.

Block 88 may be performed in accordance with any of the methods illustrated in FIGS. 8, 12, 13 and 14 and these are described in detail later in the detailed description. Furthermore, blocks 80, 84 and 86 may be performed by the controller 14 in some examples.

Figure 6:
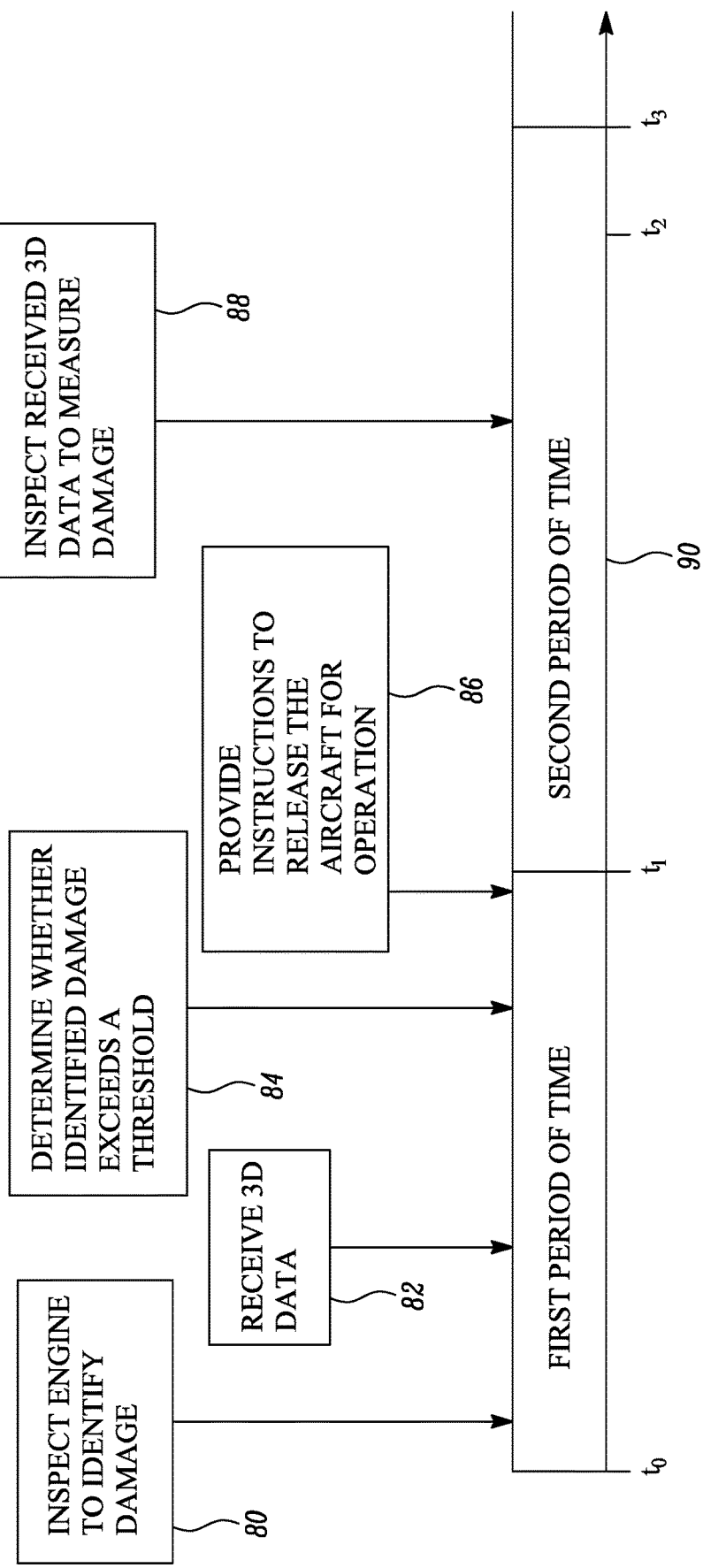
FIG. 6 illustrates a time line diagram of the first method of inspecting an engine.

FIG. 6 illustrates a time line diagram of the first method of inspecting an engine. The time line diagram comprises a horizontal axis 90 for time and blocks 80, 82, 84, 86 and 88 positioned along the horizontal axis 90. The first period of time is defined between a time $t_0$ and a time $t_1$. The second period of time is defined between time $t_1$ and $t_3$. A third period of time is defined from time $t_3$ and is a period of time in which the engine 12 may once again be inspected 'on-wing' or 'near-wing'. Similar to the first period of time, the aircraft 34 is not operational during the third period of time and is not cleared for flight by the control tower of the airport or repair facility.

The inspection of the received three-dimensional data may be performed during a predetermined period of time from release of the aircraft 34 for operation. For example, the controller 14 may be configured to complete block 88 within a period of time defined between time $t_1$ and time $t_2$ (where time $t_2$ is after time $t_1$, but before time $t_3$).

The first period of time and the second period of time are illustrated in FIG. 6 to have a similar duration to aid clarity of the figure. It should be appreciated that in most instances, the second period of time is longer than the first period of time.

The first method may be advantageous in that the aircraft 34 may be released for operation earlier than in current methods. In particular, block 80 may be performed relatively quickly because the human inspector may not carry out detailed measurements on the components of the engine 12 (for example, creep of turbine blades) and where they do not determine damage above a threshold at block 84, they may instruct the aircraft 34 to be released for operation. The detailed measurements on the components of the engine 12 may be performed by the controller 14 during the second period of time when the aircraft 34 is operational, and may even be in flight. Consequently, the first method may reduce aircraft on ground (AOG) time due to inspection.

Figure 7:
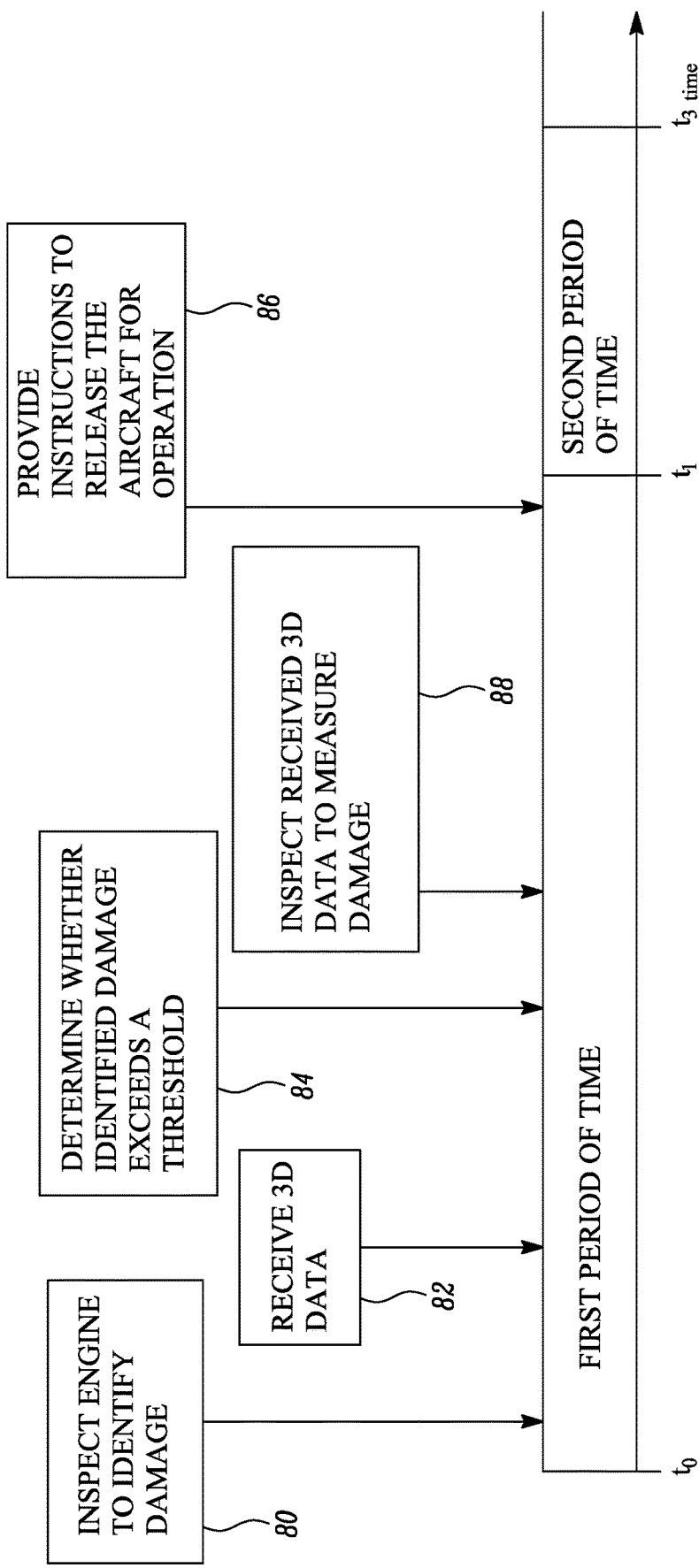
FIG. 7 illustrates a time line diagram of a second method of inspecting an engine.

FIG. 7 illustrates a time line diagram of a second method of inspecting the engine 12. The time line diagram of FIG. 7 is similar to the time line diagram of FIG. 6 and where the features are similar, the same reference numerals are used.

The method illustrated in FIG. 7 differs from the method illustrated in FIG. 6 in that block 88 is performed and completed during the first period of time and prior to block 86. For example, the controller 14 may inspect the received three-dimensional data to measure the damage received by one or more components of the engine 12 in response to receiving the three-dimensional data at block 82, or may inspect the received three-dimensional data to measure damage received by one or more components of the engine 12 in response to receive a signal from the user input device 16.

The method illustrated in FIG. 7 also differs from the method illustrated in FIG. 6 in that block 86 is only performed when it is determined, at blocks 84 and 88, that the damage is below acceptable thresholds of damage.

Similar to FIG. 6, the first period of time and the second period of time are illustrated in FIG. 7 to have a similar duration to aid clarity of the figure. It should be appreciated that in most instances, the second period of time is longer than the first period of time.

The second method may be performed when the controller 14 has sufficient computing resources and availability to enable block 88 to be performed within an acceptable period of time from the receipt of the three-dimensional data at block 82. For example, the controller 14 may select between the first method and the second method by assessing what computing resources are available upon receipt of the three-dimensional data at block 82 and determine whether block 88 may be performed within a predetermined period of time. Where the controller 14 determines that block 88 may be performed within the predetermined period of time, the controller 14 may perform the second method. Where the controller 14 determines that block 88 may not be performed within the predetermined period of time, the controller 14 may perform the first method.

The method illustrated in FIG. 7 is advantageous in that block 88 may be performed relatively quickly by the controller 14 during the first period of time and thus provide a quick and accurate inspection prior to the aircraft 34 being released for operation.

Figure 8:
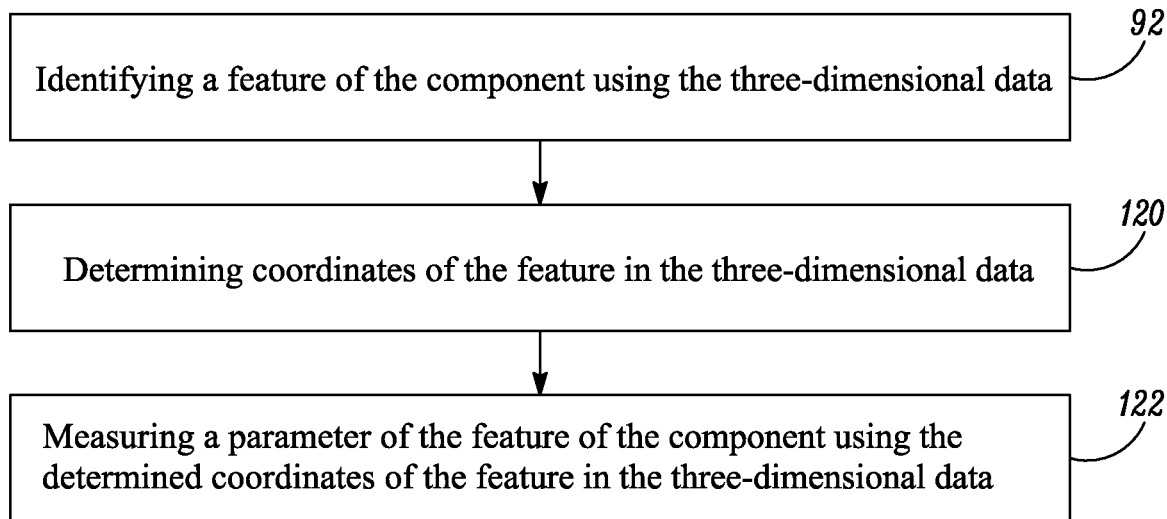
FIG. 8 illustrates a flow diagram of a third method of inspecting an engine.

FIG. 8 illustrates a flow diagram of a third method of inspecting the engine 12. The third method may be performed in block 88 illustrated in FIGS. 5, 6 and 7.

Figure 9:
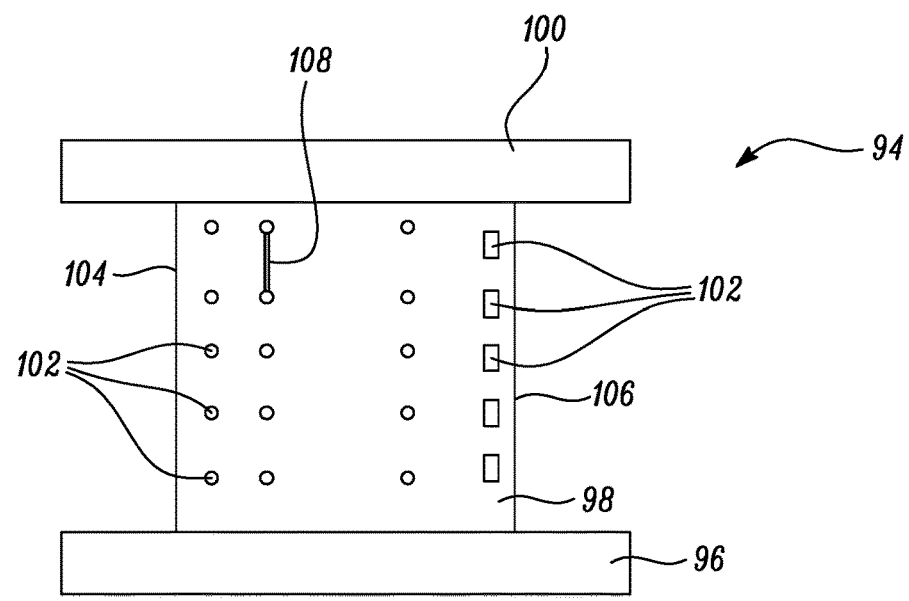
FIG. 9 illustrates a side view of a turbine blade according to a first example.
Figure 10:
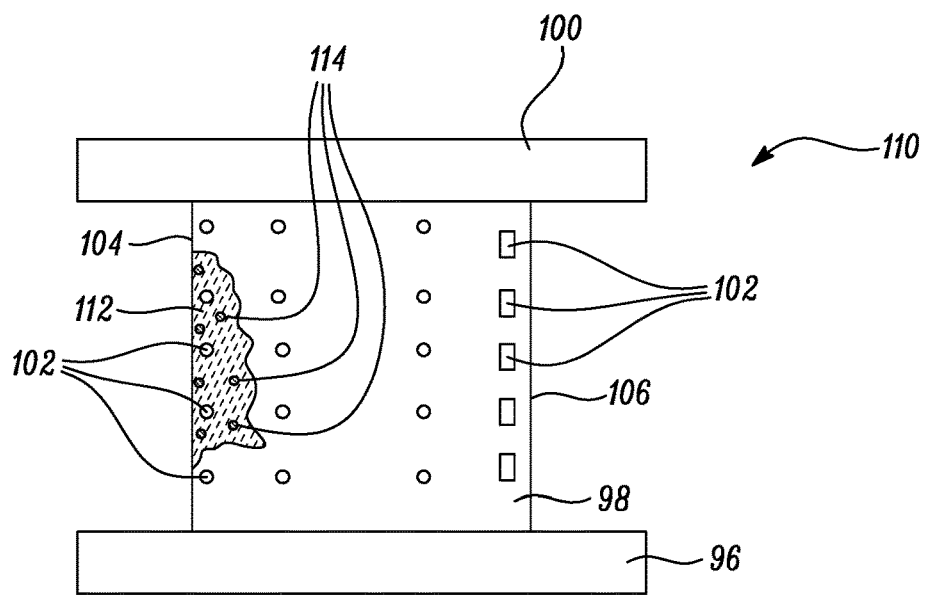
FIG. 10 illustrates a side view of a turbine blade according to a second example.
Figure 11:
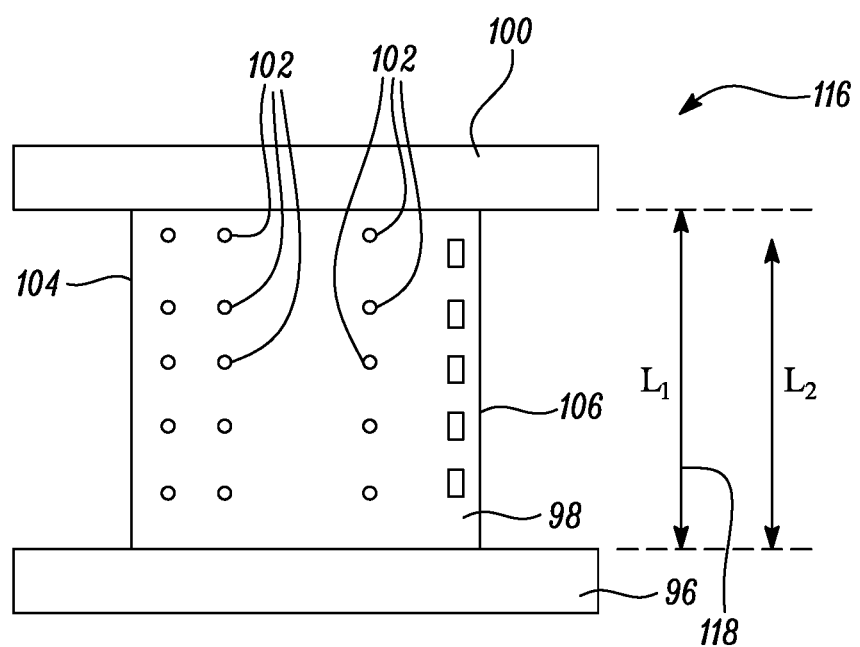
FIG. 11 illustrates a side view of a turbine blade according to a third example.

At block 92, the method includes identifying a feature of the component using the received three-dimensional data. As used herein, the word 'feature' includes any change to the component that degrades the component from its initial state (that is, the 'feature' is some form of damage and may also be referred to as a 'damage feature'). FIGS. 9, 10 and 11 illustrate three examples of such 'features' of a turbine blade and are described in the following paragraphs in more detail. It should be appreciated that these examples are not exhaustive, and a turbine blade may have different features. Also, it should be appreciated that other types of components may have different features to those illustrated in FIGS. 9, 10 and 11.

FIG. 9 illustrates a side view of a turbine blade 94 according to a first example. The turbine blade 94 comprises a platform 96, an aerofoil 98, and a shroud 100. The aerofoil 98 defines a plurality of cooling holes 102 and has a leading edge 104 and a trailing edge 106. The turbine blade 94 comprises a feature 108 which is, in this example, a crack that extends between adjacent cooling holes 102 near the leading edge 104 of the aerofoil 98. The measurable dimensions of the crack 108 include length, width and depth.

FIG. 10 illustrates a side view of a turbine blade 110 according to a second example. The turbine blade 110 is similar to the turbine blade 94 and where the features are similar, the same reference numerals are used.

The turbine blade 110 comprises a feature 112 which is, in this example, erosion that extends along the leading edge 104 and towards the trailing edge 106. The erosion 112 is defined by the removal of surface material of the turbine blade 94 and may include a plurality of cavities 114 that extend into the aerofoil 98. The measurable dimensions of the erosion 112 include length, width, surface area of erosion, and depth of the eroded area relative to an uneroded area.

FIG. 11 illustrates a side view of a turbine blade 116 according to a third example. The turbine blade 116 is similar to the turbine blades 94 and 110 and where the features are similar, the same reference numerals are used.

The turbine blade 116 comprises a feature 118 which is, in this example, creep of the turbine blade 116. The creep 118 may be defined by the elongation of the aerofoil 98 and may be measured by measuring the distance $L_1$ between the platform 96 and the shroud 100 at the trailing edge 106 and subtracting the distance $L_2$ of the aerofoil 98. $L_2$ may be the distance between the platform 96 and the shroud 100 after manufacture of the turbine blade 116, but before use of the turbine blade 116 in the engine 12 (that is, the initial state of the turbine blade 116). Alternatively, $L_2$ may be the designed distance between the platform 96 and the shroud 100 (that is, the distance in the computer aided design (CAD) model of the turbine blade 116).

The creep 118 may additionally or alternatively be defined by the aerofoil 98 twisting through an angle about the longitudinal axis of the turbine blade 116 (where the longitudinal axis extends between, and is perpendicular to, the platform 96 and the shroud 100).

Returning to FIG. 8, in some examples, the feature to be identified may be predetermined by the controller 14. In other words, the controller 14 may be pre-configured to identify a feature of the component and the controller 14 requires no further input to determine the feature to be identified. In other examples, the controller 14 may control the display 18 to display a plurality of features and a user may operate the user input device 16 to select one or more of the displayed features to be identified.

The controller 14 may use any suitable method or methods for identifying a feature. For example, the controller 14 may use any one or more of: CAD alignment/registration, Procrustes analysis, iterative closest point (IPC) registration, random sample consensus (RANSAC), plane matching, point cloud segmentation, and machine learning to identify a feature.

At block 120, the method includes determining coordinates of the identified feature in the three-dimensional data. In some examples, the controller 14 may determine the coordinates of the identified feature by determining the coordinates of the perimeter of the identified feature in the received three-dimensional data.

At block 122, the method includes measuring a parameter of the feature of the component using the determined coordinates of the feature in the three-dimensional data. As used herein, a 'parameter' includes physical dimensions of a feature (length, width and so on for example), the number of features, the density of features, and the spacing between features. In some examples, block 122 may include measuring a plurality of parameters of the feature using the determined coordinates of the feature in the three-dimensional data.

The controller 14 may measure at least one of: one or more angles, one or more lengths, an area, a volume of the identified feature, the number of identified features, the density of identified features, and the spacing between features, using the determined coordinates. In order to perform the measurement(s), the controller 14 may perform point cloud processing (such as RANSAC, three-dimensional object matching), CAD alignment with a model of the component, and/or point cloud stitching.

Taking FIG. 9 as an example, the controller 14 may use the determined coordinates of the crack 108 to measure the length, the width and the depth of the crack 108 in the aerofoil 98. Considering FIG. 10, the controller 14 may use the determined coordinates of the eroded portion 112 to measure the surface area and depth of the eroded portion 112 of the aerofoil 98. The controller 14 may also use the determined coordinates to determine the depth and diameter of the cavities 114. Turning to FIG. 11, the controller 14 may use the determined coordinates to measure the length $L_1$ and then determine the creep of the turbine blade 116 by subtracting $L_2$ from $L_1$.

At block 122, the method may additionally include controlling storage of the measured parameter or parameters in a dataset 123 in the memory 26.

Figure 12:
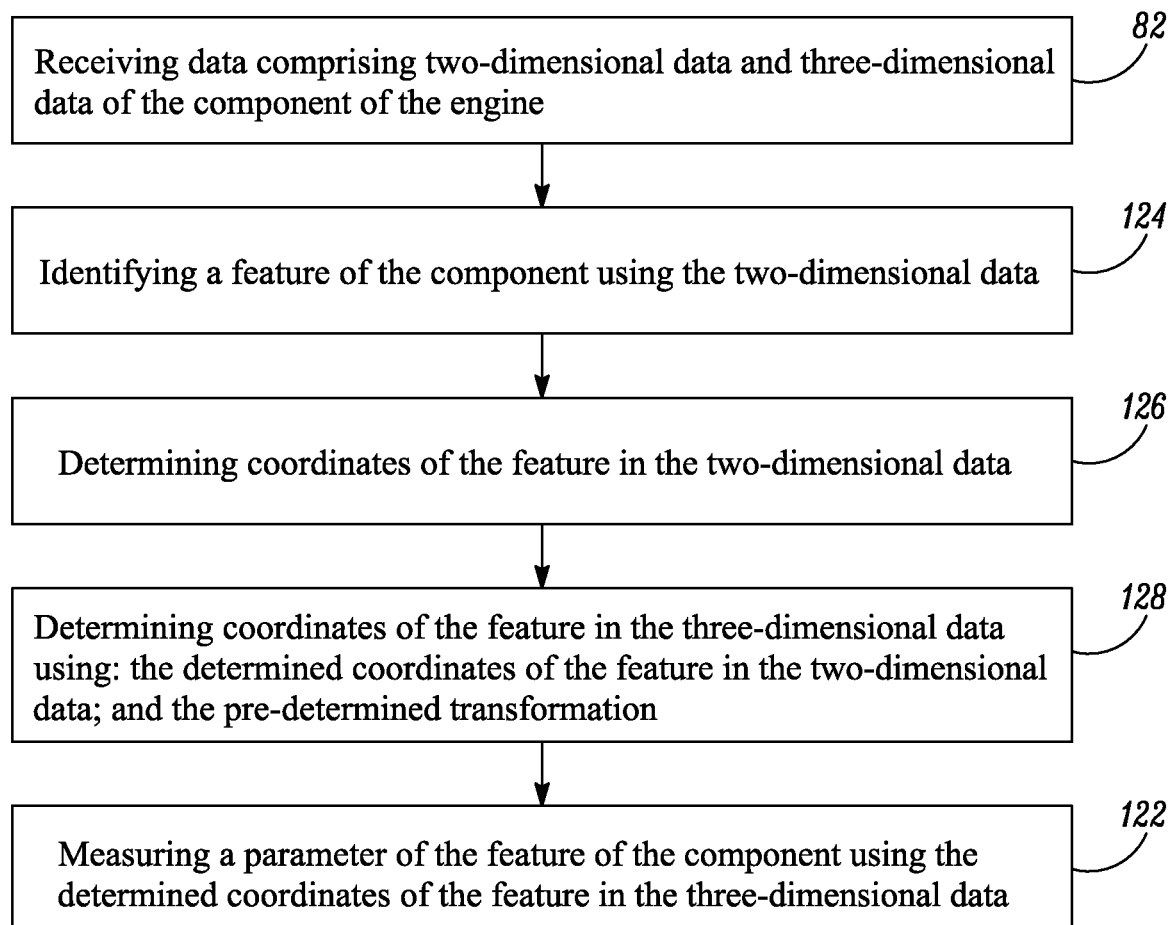
FIG. 12 illustrates a flow diagram of a fourth method of inspecting an engine.

FIG. 12 illustrates a flow diagram of a fourth method of inspecting the engine 12. The controller 14 may perform the fourth method where the sensor 22 comprises a two-dimensional sensor and a three-dimensional sensor. The fourth method illustrated in FIG. 12 is similar to the first method illustrated in FIG. 5 and to the third method illustrated in FIG. 8 and where the blocks are similar, the same reference numerals are used.

At block 82, the method includes receiving data comprising two-dimensional data and three-dimensional data of one or more components of the engine 12. For example, the controller 14 may receive a .jpg file (two-dimensional data) from a camera of the sensor 22 of one or more components of the engine 12 and a .csv file (three-dimensional data) from a structured light sensor of the sensor 22 of the same one or more components of the engine 12.

At block 124, the method includes identifying a feature of the one or more components using the two-dimensional data. For example, the controller 14 may use any suitable technique for identifying a feature in the .jpg file received at block 82. Suitable techniques include correlation, matching, texture analysis, and artificial intelligence (a deep learning neural network for example).

At block 126, the method includes determining coordinates of the identified feature in the two-dimensional data. For example, the controller 14 may determine the coordinates of each pixel of the feature identified in block 124 in the .jpg file.

At block 128, the method includes determining coordinates of the identified feature in the received three-dimensional data using: the determined coordinates of the identified feature in the two-dimensional data; and the predetermined transformation algorithm 29. For example, the controller 14 may calculate the coordinates of the identified feature in the received three-dimensional data by applying the transformation algorithm 29 to the two-dimensional coordinates of the feature determined at block 126.

The fourth method then moves to block 122 and includes measuring one or more parameters of the identified feature of the component using the coordinates of the identified feature in the three-dimensional data. The fourth method may also include controlling storage of the measured one or more parameters at block 122.

The fourth method may be advantageous where the controller 14 has a higher probability of identifying a feature in the two-dimensional data than in the three-dimensional data. For example, some features (such as erosion) may be relatively challenging for the controller 14 to identify in the three-dimensional data because the change in coordinates (relative to the original state of the component) may be small. However, such features may readily identifiable in the two-dimensional data by the controller 14 due to a change in colour or pattern.

Figure 13:
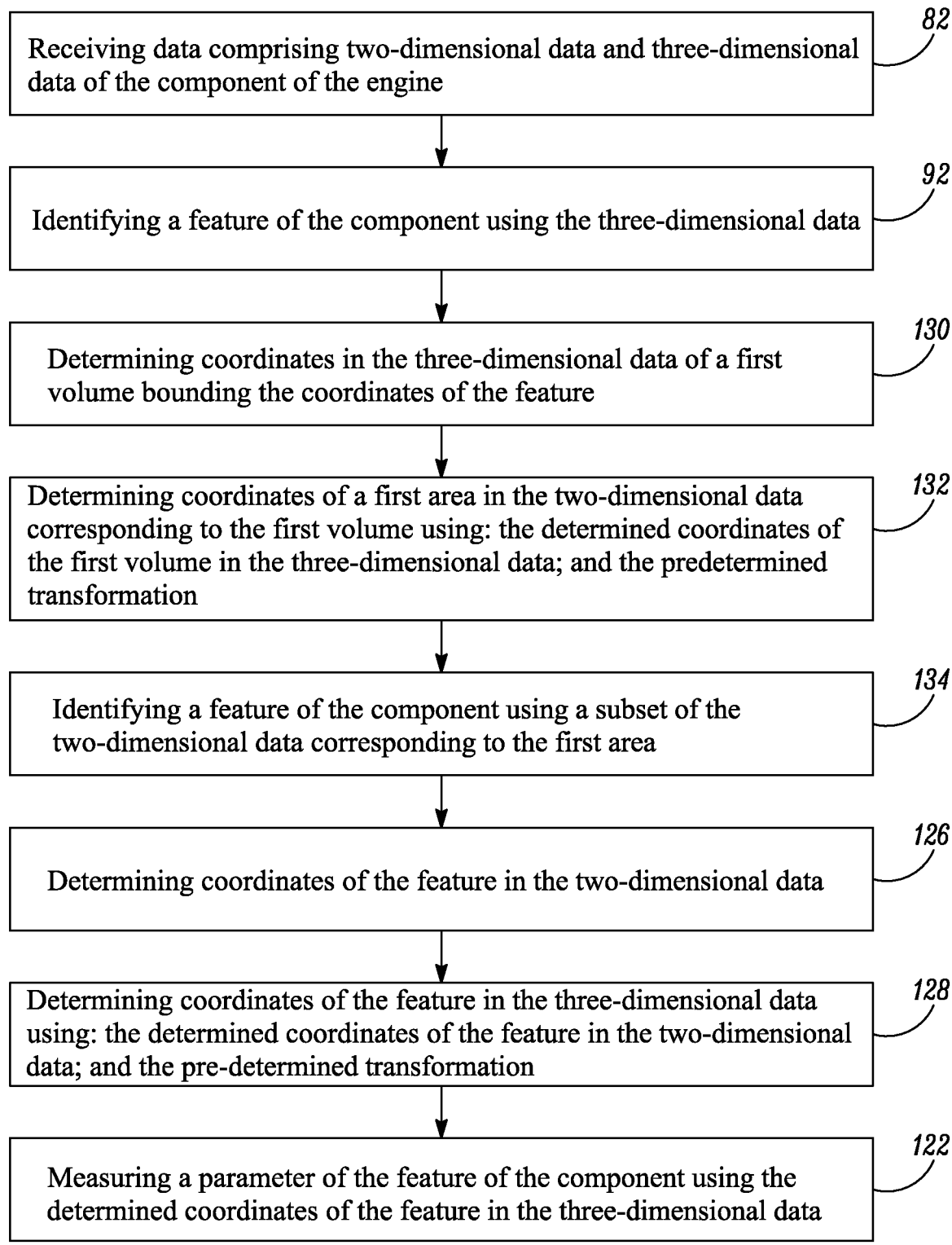
FIG. 13 illustrates a flow diagram of a fifth method of inspecting an engine.

FIG. 13 illustrates a flow diagram of a fifth method of inspecting the engine 12. The fifth method is similar to the first method illustrated in FIG. 5, the third method illustrated in FIG. 8, and the fourth method illustrated in FIG. 12, and where the blocks are similar, the same reference numerals are used.

At block 82, the fifth method includes receiving data comprising two-dimensional data and three-dimensional data of the component of the engine 12. The fifth method then moves to block 92 and includes identifying a feature of the component of the engine 12 using the received three-dimensional data.

At block 130, the fifth method includes determining coordinates in the three-dimensional data of a first volume bounding the coordinates of the feature. In some examples, the first volume may be defined by the three-dimensional perimeter of the identified feature. In other examples, the first volume may be defined by a three-dimensional region of interest which encompasses the three-dimensional coordinates of the identified feature. The region of interest may be identified using a three-dimensional (CAD) model of the component stored in the memory 26 to assist in the identification of the sub-component that comprises the identified feature.

The fifth method then moves to block 132 and includes determining coordinates of a first area in the two-dimensional data corresponding to the first volume using: the determined coordinates of the first volume in the three-dimensional data; and the predetermined transformation algorithm 29. For example, the controller 14 may calculate the coordinates of the first area by applying the transformation algorithm 29 to the determined coordinates of the first volume.

At block 134, the fifth method includes identifying a feature of the component using a subset of the two-dimensional data corresponding to the first area. For example, where the two-dimensional data received at block 82 comprises a 1920 pixel by 1080 pixel image and the feature is erosion, the subset of data corresponding to the first area has coordinates of 200 to 500 on the horizontal (X) axis and coordinates of 600 to 800 on the vertical axis (Y). The controller 14 may perform feature analysis and identification as described above with reference to block 124 on this subset of the two-dimensional data.

It should be appreciated that block 134 is likely to identify the same feature as the feature identified at block 92, but may identify additional features since the analysis is performed on two-dimensional data, whereas block 134 is performed on three-dimensional data. For example, the controller 14 may identify an eroded portion 112 of an aerofoil 98 at block 92, and may identify the eroded portion 112 and a crack at block 134.

The fifth method then moves to block 126 and includes determining coordinates of the feature identified at block 134 in the two-dimensional data.

At block 128, the fifth method includes determining coordinates of the feature identified at block 134 in the three-dimensional data using: the coordinates of the feature in the two-dimensional data determined at block 126; and the predetermined transformation algorithm 29.

The fifth method then moves to block 122 and includes measuring one or more parameters of the feature identified at block 134 using the three-dimensional coordinates of the feature determined at block 128. The fifth method may also comprise controlling storage of the measured one or more parameters at block 122.

The fifth method may advantageously increase the probability of identifying a feature of a component of the engine 12 because feature analysis and identification is performed on both the two-dimensional data and three-dimensional data received at block 82.

Figure 14:
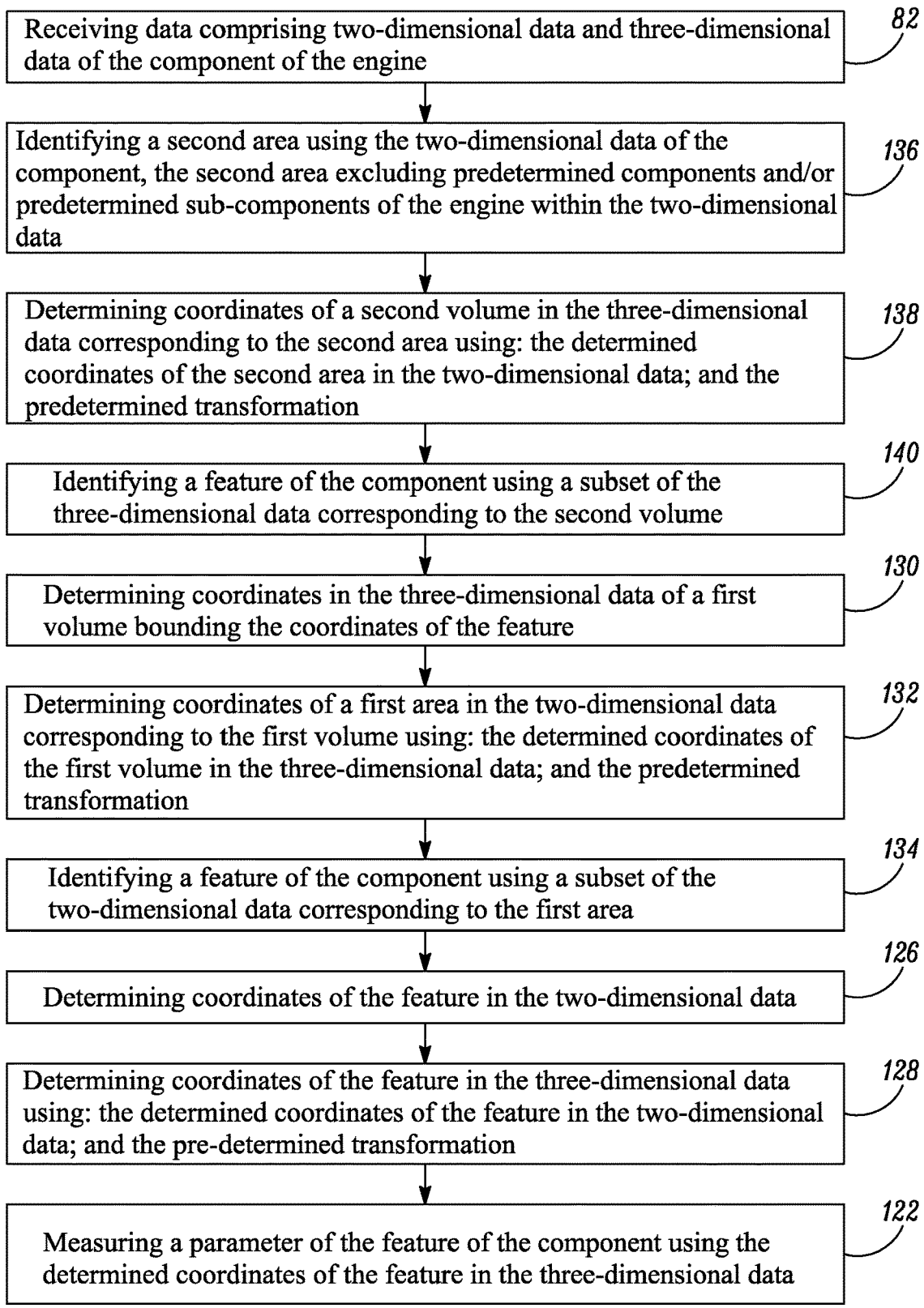
FIG. 14 illustrates a flow diagram of a sixth method of inspecting an engine.

FIG. 14 illustrates a sixth method of inspecting the engine 12. The sixth method is similar to the first method illustrated in FIG. 5, the third method illustrated in FIG. 8, the fourth method illustrated in FIG. 12, and the fifth method illustrated in FIG. 13 and where the blocks are similar, the same reference numerals are used.

At block 82, the method includes receiving data comprising two-dimensional data and three-dimensional data of the engine 12.

The sixth method then moves to block 136 and includes identifying a second area using the two-dimensional data of the component of the engine 12. The second area excludes predetermined components and/or predetermined sub-components of the engine 12 within the two-dimensional data. For the example, the controller 14 may be configured to identify cracks 108 in the aerofoil 98 (either pre-configured or user-configured as described above) and may exclude the platform 96 and the shroud 100 (which are sub-components of the turbine blade 94, 110, 116). Where the two-dimensional data comprises data on other components (such as a stator blade for example), the controller 14 may exclude such components from the second area at block 136.

At block 138, the sixth method includes determining coordinates of a second volume in the three-dimensional data corresponding to the second area using:

the determined coordinates of the second area in the two-dimensional data; and the predetermined transformation algorithm 29. For example, the controller 14 may apply the transformation algorithm 29 to the two-dimensional coordinates of the second area determined at block 136 to calculate the coordinates of the second volume in the three-dimensional data.

The sixth method then moves to block 140 and includes identifying a feature of the component using a subset of the three-dimensional data corresponding to the second volume calculated at block 138. It should be appreciated that block 140 is similar to block 92 in the third method illustrated in FIG. 8 and in the fifth method illustrated in FIG. 13, but differs in that feature analysis and identification is only performed on a subset of the three-dimensional data (that is, the three-dimensional data that corresponds to the second volume).

The sixth method then moves through blocks 130, 132, 134, 126, 128 and 122 to provide a measurement of one or more parameters of the identified feature of the component. The sixth method may also include controlling storage of the measured one or more parameters at block 122.

The sixth method may be advantageous in that the analysis of the two-dimensional data to remove irrelevant data (at blocks 136 and 138) may increase the efficiency of the analysis of the three-dimensional data (at block 140). This may reduce the time taken by the controller 14 to perform block 140, and/or may enable a reduction in the use of the computational resources of the controller 14.

The methods illustrated in FIGS. 8, 12, 13 and 14 may be advantageous in that the stored measured parameter or parameters 123 may be used to determine the condition of a component and schedule the next inspection (and potential repair or replacement) of the component.

It will be understood that the invention is not limited to the embodiments above-described and various modifications and improvements can be made without departing from the concepts described herein. For example, the different embodiments may take the form of an entirely hardware embodiment, an entirely software embodiment, or an embodiment containing both hardware and software elements.

The methods illustrated in FIGS. 8, 12, 13 and 14 are described above in terms of identifying and measuring a single feature of a single component. It should be appreciated that these methods may also be used to identify and measure a plurality of features on a single component. Furthermore, these methods may be used to identify a plurality of features across a plurality of components (where a single component may have one or more features).

In some examples, block 82 may only comprise receiving two-dimensional data of one or more components of the engine 12, and block 88 comprises inspecting the received two-dimensional data during the second period of time to measure damage. In these examples, the controller 14 may use the techniques mentioned above with reference to block 124 to identify one or more features in the two-dimensional data and may measure one or more parameters of those features using the two-dimensional data.

In some examples, the method illustrated in FIG. 5 and described above may be performed for engines that are not associated with an aircraft (such industrial gas turbines). In these examples, the first period of time is an inspection phase for the engine (where the engine is non-operational), and the second period of time is an operational phase for the engine. Furthermore, the method illustrated in FIG. 5 may be performed for any industrial system (an oil and gas facility for example) where the first period of time is an inspection phase for the industrial system (where the industrial system is non-operational), and the second period of time is an operational phase for the industrial system.

Except where mutually exclusive, any of the features may be employed separately or in combination with any other features and the disclosure extends to and includes all combinations and sub-combinations of one or more features described herein.

We claim:

1. A computer-implemented method comprising:
receiving data comprising two-dimensional data and three-dimensional data of a component of an engine;
identifying a feature of the component using the two-dimensional data;
determining coordinates of the feature in the two-dimensional data;
determining coordinates of the feature in the three-dimensional data using: the determined coordinates of the feature in the two-dimensional data; and a pre-determined transformation between coordinates in two-dimensional data and coordinates in three-dimensional data;
measuring a parameter of the feature of the component using the determined coordinates of the feature in the three-dimensional data;
upon determining that the measured parameter of the feature is in an acceptable condition for operation, transmitting an instruction to enable an aircraft with the engine to be released; and
upon determining that the measured parameter of the feature is not in the acceptable condition for operation, transmitting an instruction to prohibit the aircraft from being released,
wherein prior to identifying the feature of the component, the method further comprises:
identifying the feature of the component using the three-dimensional data;
determining coordinates in the three-dimensional data of a first volume bounding coordinates of the feature; and
determining coordinates of a first area in the two-dimensional data corresponding to the first volume using: the determined coordinates of the first volume in the three-dimensional data; and the predetermined transformation.

2. The computer-implemented method as claimed in claim 1, wherein identifying the feature of the component using the two-dimensional data comprises using a subset of the two-dimensional data corresponding to the first area.

3. The computer-implemented method as claimed in claim 1, wherein determining coordinates in the three-dimensional data of the first volume comprises:
identifying the first volume in the three-dimensional data using: the identified feature of the component; and a three-dimensional model of the component.

4. The computer-implemented method as claimed in claim 1, wherein prior to identifying the feature of the component using the three-dimensional data, the method further comprises:
identifying a second area using the two-dimensional data of the component, the second area excluding predetermined components and/or predetermined sub-components of the engine within the two-dimensional data;
determining coordinates of a second volume in the three-dimensional data corresponding to the second area using: the determined coordinates of the second area in the two-dimensional data; and the predetermined transformation.

5. The computer-implemented method as claimed in claim 4, wherein identifying the feature of the component using the three-dimensional data comprises: identifying the feature of the component using a subset of the three-dimensional data corresponding to the second volume.

6. The computer-implemented method as claimed in claim 1, further comprising: controlling storage of the measured parameter.

7. The computer-implemented method as claimed in claim 1, wherein the data is generated during a first period of time in which the aircraft is not released for operation.

8. The computer-implemented method as claimed in claim 7, wherein the computer-implemented method is performed during a second period of time in which the aircraft is released for operation.

9. The computer-implemented method as claimed in claim 1, wherein the computer-implemented method is performed automatically in response to receiving the data.

10. The computer-implemented method as claimed in claim 9, wherein the computer-implemented method is performed without human intervention.

11. A non-transitory computer readable medium storing a computer program that, when executed by a computer, causes the computer to perform the computer-implemented method as claimed in claim 1.

12. A non-transitory computer readable storage medium comprising computer readable instructions that, when executed by a computer, causes the computer to perform the computer-implemented method as claimed in claim 1.

13. An apparatus comprising:
a controller configured to perform the computer-implemented method as claimed in claim 1.

* * * * *